United States Patent
Agrawal et al.

(10) Patent No.: US 6,434,191 B1
(45) Date of Patent: Aug. 13, 2002

(54) ADAPTIVE LAYERED CODING FOR VOICE OVER WIRELESS IP APPLICATIONS

(75) Inventors: Prathima Agrawal, New Providence; Jyh-Cheng Chen, Flanders, both of NJ (US); Parameswaran Ramanathan, Madison, WI (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/653,913

(22) Filed: Sep. 1, 2000

Related U.S. Application Data

(60) Provisional application No. 60/156,908, filed on Sep. 30, 1999.

(51) Int. Cl.[7] .................................................. H04B 3/46
(52) U.S. Cl. ...................... 375/227; 375/285; 375/296; 375/346; 370/252; 714/751; 714/776
(58) Field of Search ................................. 375/285, 296, 375/346, 225, 226, 227; 370/242, 252, 465, 468; 714/750, 751, 776, 759, 760, 786

(56) References Cited

U.S. PATENT DOCUMENTS

| | | | | |
|---|---|---|---|---|
| 6,009,553 A | * | 12/1999 | Martinez et al. | 714/784 |
| 6,141,388 A | * | 10/2000 | Sevais et al. | 375/262 |
| 6,154,489 A | * | 11/2000 | Kleider et al. | 375/221 |
| 6,172,972 B1 | * | 1/2001 | Birdwell et al. | 370/349 |
| 6,208,663 B1 | * | 3/2001 | Schramm et al. | 370/465 |

OTHER PUBLICATIONS

T. Turletti et al., "A Simple Layered Audio Coding Scheme", INRIA Research Repot No. 3296, Nov. 1997.

* cited by examiner

Primary Examiner—Stephen Chin
Assistant Examiner—Dac V. Ha
(74) Attorney, Agent, or Firm—Joseph Giordano; James W. Falk

(57) ABSTRACT

A methodology and concomitant circuitry for adaptively controlling the number of packets and the error-correction applied to each packet in a layered coding communication system. The determination of the number of packets and the error-correction is based upon the bit-error rate of the channel propagating the packets.

14 Claims, 11 Drawing Sheets

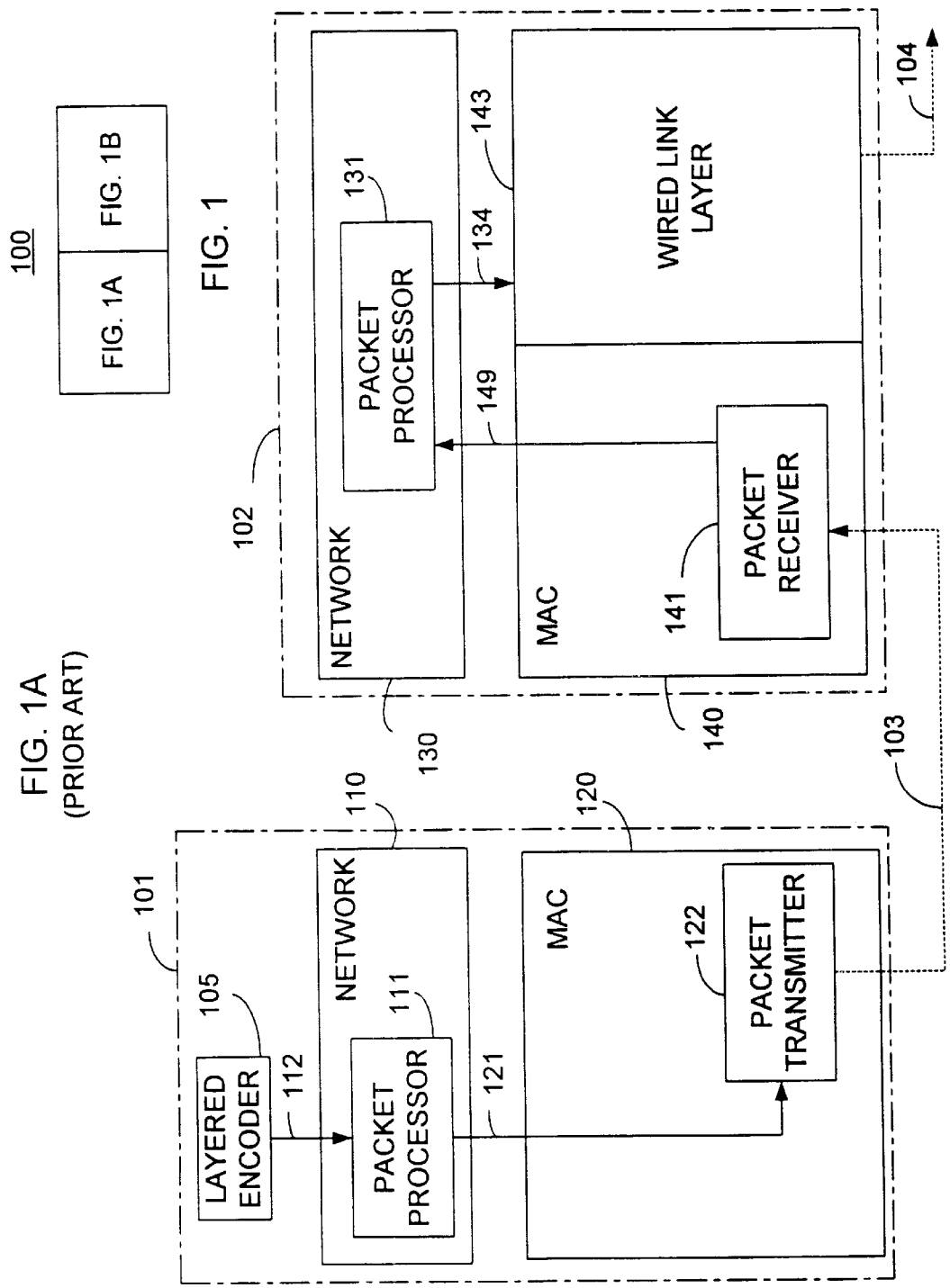

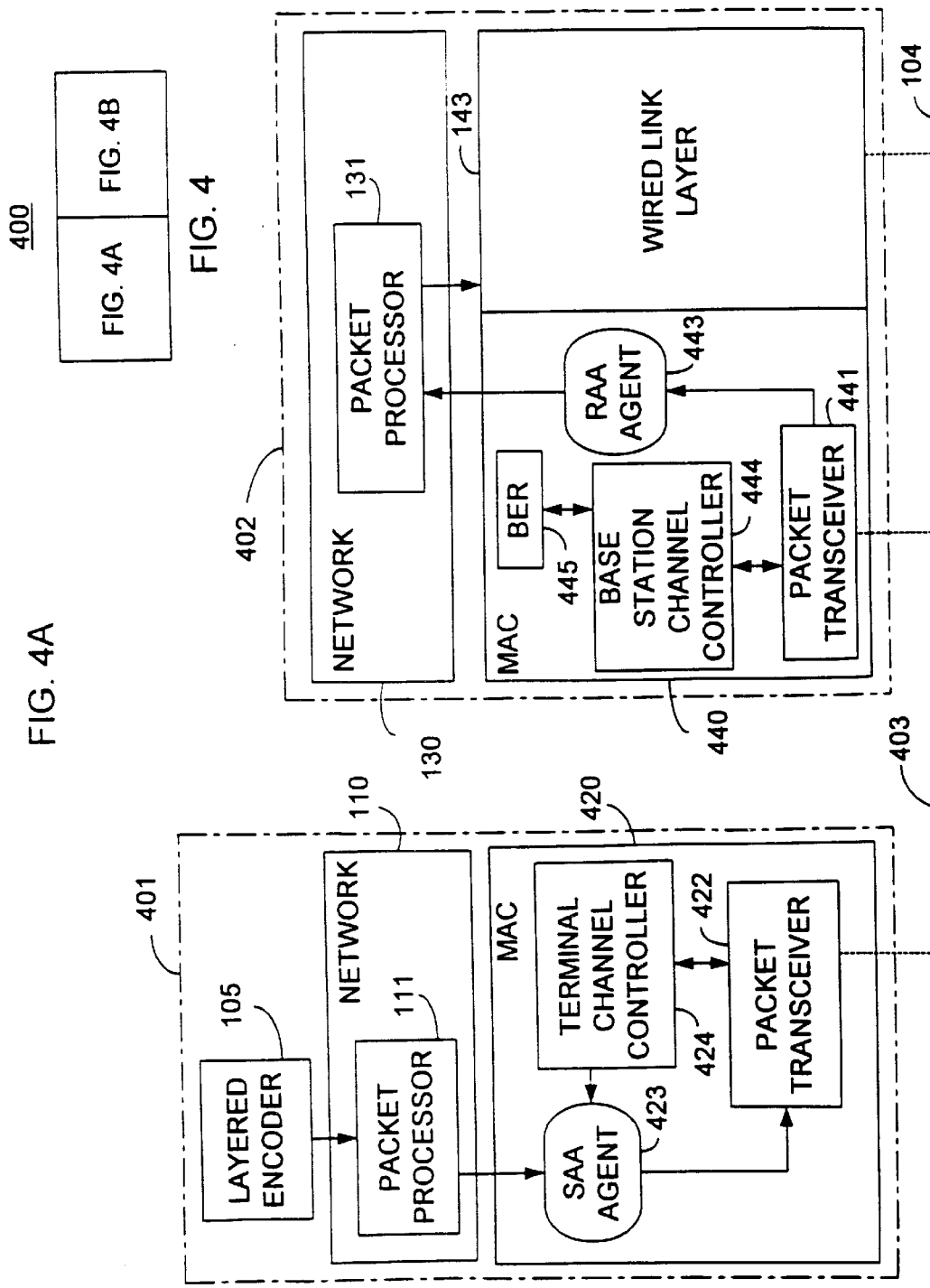

ADAPTIVE LAYERED CODING FOR VOICE OVER WIRELESS IP APPLICATIONS

CROSS-REFERENCE TO RELATED APPLICATION

This application is a non-provisional application of provisional application Serial No. 60/156,908 filed Sep. 30, 1999.

BACKGROUND OF THE DISCLOSURE

1. Field of the Invention

This invention relates generally to packet communications, and, more particularly, to methodologies and concomitant circuitry for adaptively controlling the number of packets and the error-correction applied to each packet in layered coding communications.

2. Description of the Background

Traditionally, voice and data traffic were carried over different networks—voice over circuit-switched telephone networks and data over Internet Protocol (IP)-based packet networks. However, this dichotomy is rapidly disappearing and voice traffic is increasingly being carried over IP-based packet networks. In addition, due to growing demand for "anywhere, anytime" communication, the end users are often connected to the network over a wireless link. This means that the voice traffic is increasingly being carried over wireless-IP networks.

To fully understand the import of carrying voice traffic in the wireless environment, it is necessary to consider related background, as follows. In conventional digital telephone networks, an 8-bit sample of the voice conversation is taken once every 125 microseconds and sent over the digital network. However, in IP networks, sending an 8-bit data once every 125 microseconds would result in considerable bandwidth overhead because each IP packet contains a 20-byte header. Therefore, voice-over-IP applications typically include multiple samples in a packet. For example, a voice-over-IP application may collect 320 8-bit samples over a period of 40 ms and send all the 320 samples as a single IP packet. This is referred to as "packetization". In addition, voice-over-IP applications often use techniques such as silence suppression and compression to reduce the bandwidth required to relay voice conversations. (However, for ease of understanding, it is assumed that silence suppression and compression techniques are not being used by the application. Silence suppression and compression techniques can be readily introduced during the packetization process using conventional techniques).

One problem with packetization is that packet losses are fairly common in IP networks and a loss of a single packet will result in the loss of many samples and thereby degrade the quality of regenerated voice signal. To overcome this problem, a technique called layered coding has been devised. Representative of art exploiting layered coding is the article entitled "Experiments with a Layered Transmission Scheme over the Internet", authored by T. Turletti et al., and published as INRIA Research Report No. 3296, November 1997. In the example of the foregoing paragraph, voice traffic is sent as a single stream of IP packets. In layered coding, however, the voice traffic is sent as several independent streams of IP packets. Each stream of packets is called a "layer". At the receiver, each layer can be decoded independently of the other layers. Since packets from a plurality of layers are available at the time of decoding, the quality of regenerated voice signal will be better. The advantage of this approach is that loss of a packet means the loss of only one layer at the decoder, which in turn does not significantly degrade the quality of the regenerated signal.

For example, suppose that a voice-over-IP application uses four layers. Then, one possible approach for layered coding is to send four IP packets once every 160 ms where the four IP packets are generated as follows. In 160 ms, the application will collect 320×4 8-bit samples. These samples are interleaved to form four packets. That is, the first packet will contain samples 1, 5, 9, 13, . . . , 1273, and 1277. The second packet will contain samples 2, 6, 10, 14, . . . , 1274, and 1278. The third packet will contain the samples 3, 7, 11, 15, . . . , 1275, and 1279. Finally, the fourth packet will contain the samples 4, 8, 12, 16, . . . , 1276, and 1280. The advantage of such an interleaving scheme is that, if a packet is lost, then only one in every four samples is lost, and the information contained in a lost sample can be fairly accurately estimated from the available nearby samples using, for example, digital interpolation.

Layered coding is very effective in dealing with packet losses if the losses are spread out in time such that the likelihood of several consecutive packet losses is small. Unfortunately, when an IP stream traverses a wireless link the likelihood of several consecutive losses is often not very small. This is because packet losses in a wireless link occur when the channel quality is poor and the resulting bit error rate is high. Since channel quality may remain poor for several up to hundreds of milliseconds, several consecutive packets are often lost.

The art is devoid, however, of techniques for adaptively controlling the number of packets transmitted in layered coding communications, as well as adaptively determining the error-correction to be applied to the packets, wherein the adaptation is based upon the bit-error rate of the over-the-air propagation path from transmitter to receiver (mobile terminal to base station in one direction, and vice versa in the other direction).

SUMMARY OF THE INVENTION

These shortcomings as well as other limitations and deficiencies of the prior art are obviated, in accordance with the present invention, by a methodology and concomitant circuitry wherein, generally, an adaptive forward error correction technique is introduced into the layered coding approach for better delivery of voice traffic over a wireless-IP link.

Broadly, in accordance with a method aspect of the present invention, a method for processing a plurality of packets to propagate over a path having a measurable bit-error rate includes: (a) selecting for propagation a sequence of packets from the plurality of packets based upon the bit-error rate; and (b) encoding each of the packets in the sequence with a forward error-correcting code determined with reference to the bit error rate.

Broadly, in accordance with a system aspect of the present invention, a transmitter for processing a plurality of packets to propagate over a includes: (a) a generator to select for propagation a sequence of packets from the plurality of packets based upon the bit-error rate; and (b) an encoder for encoding each of the packets in the sequence with a forward error-correcting code determined with reference to the bit error rate.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate elements that are common to the figures.

DETAILED DESCRIPTION

To place in perspective the detailed description of the present invention, it is instructive to first gain a basic understanding of the inventive adaptive layered coding technique in an overview manner. This approach has the advantage of introducing notation and terminology that will aid in elucidating the various detailed aspects of the present invention. Thus, the first part of the description focuses on a high-level discussion of the functionality of both the conventional layered coding technique as well as of the inventive technique as embodied in layered coding so as to distinguish the inventive technique from the conventional arrangement. After this, another pass through the details of the methodology and concomitant system in accordance with the present invention will complete the detailed description.

Overview

Figure 1B:
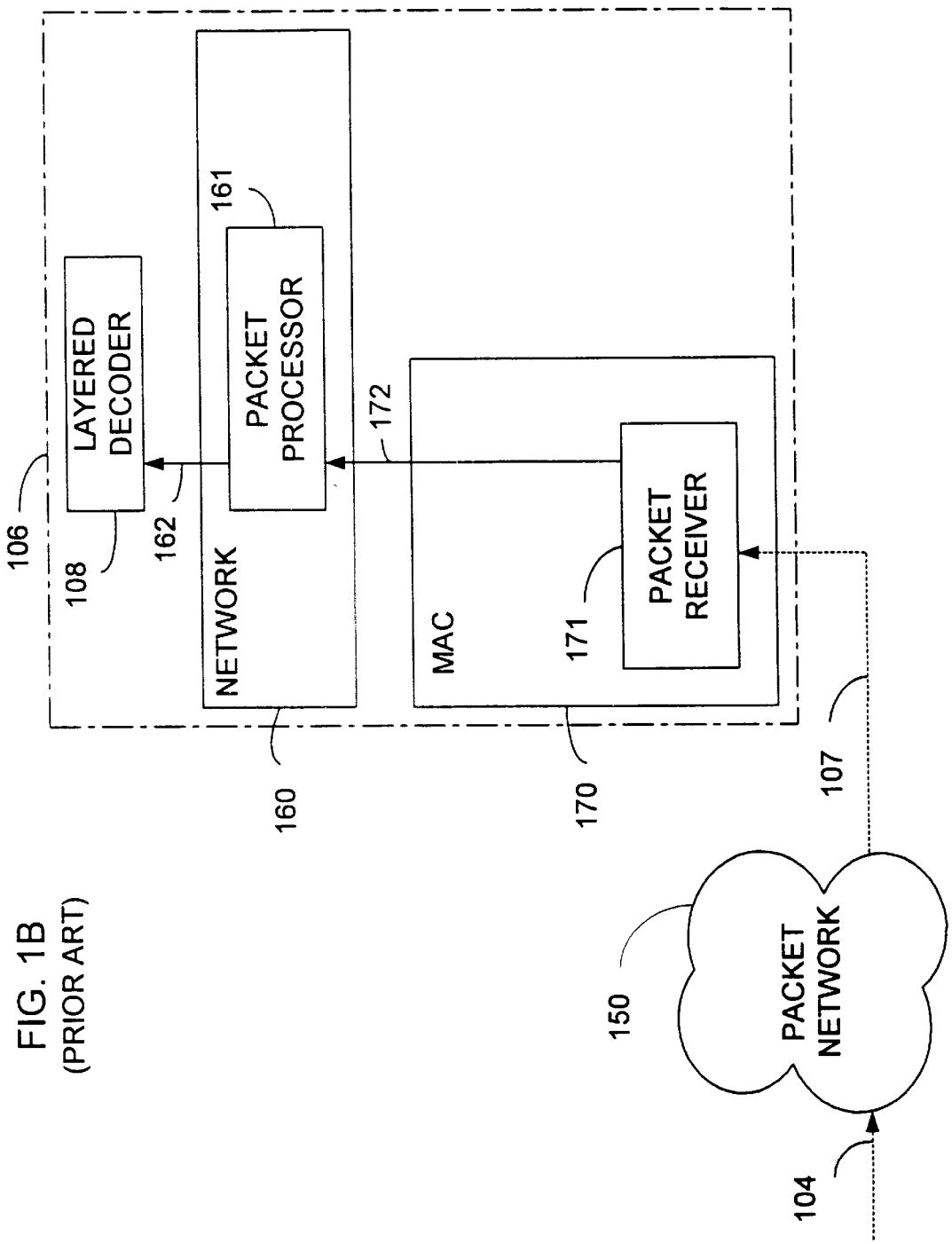
FIG. 1, composed of FIGS. 1A and 1B, is a high-level block diagram of a conventional mobile terminal communicating with a base station to effect layered coding.

System 100, illustrated in FIG. 1 (composed of FIGS. 1A and 1B) is representative of a prior art system that serves as the point of departure for the present invention. With reference to FIG. 1A, there is shown pertinent aspects of conventional layered coding system 100 whereby mobile terminal 101 is communicating with base station 102. For purposes of immediate discussion, mobile terminal 101 is operating in its transmitting mode, whereas base station 102 is operating in its receiving mode. Within terminal 101, there are explicitly shown the "network" layer 110 and the wireless "link" layer or, equivalently, Medium Access Control (MAC) layer 120, of the Open System Interconnection (OSI) seven-layer model. Conventionally, the layered encoding of packets is effected above network layer 110 by layered encoder 105 so that intermediate routers in the network layer (not shown) are transparent to layered encoding. Encoder 105 passes the encoded packets through path 112 to packet processor 111 of network layer 110; processor 111 may process packets, such as by appending an appropriate network layer header, and then pass the layered encoded packets originated by layered encoder 105 onto packet transmitter 122 of MAC layer 120 via path 121; packet transmitter 122 then emits the encoded packets to over-the-air propagation path 103 interconnecting mobile terminal 101 with base station 102.

Packets transmitted to base station 102 are received in MAC layer 140 by packet receiver 141, which efficiently interfaces to propagation path 103. Received encoded packets are delivered from packet receiver 141 to packet processor 131 in network layer 130, via path 149; packet processor 131 appropriately processes received encoded packets for delivery to wired link layer 143 over path 134 for upstream transmission via transmission path 104 to the packet network 150 (FIG. 1B).

With reference to FIG. 1B, there is shown receiving terminal 106 wherein packet receiver 171 of MAC layer 170 receives encoded packets arriving over path 107 from packet network 150. Received encoded packets are transmitted to packet processor 161 in network layer 160 via path 172; packet processor removes the network layer header, if any, and delivers, over path 162, the encoded packets to layered decoder 108 residing above network layer 160. The packets decoded by layered decoder 108 are now ready to be played back.

Figure 2:
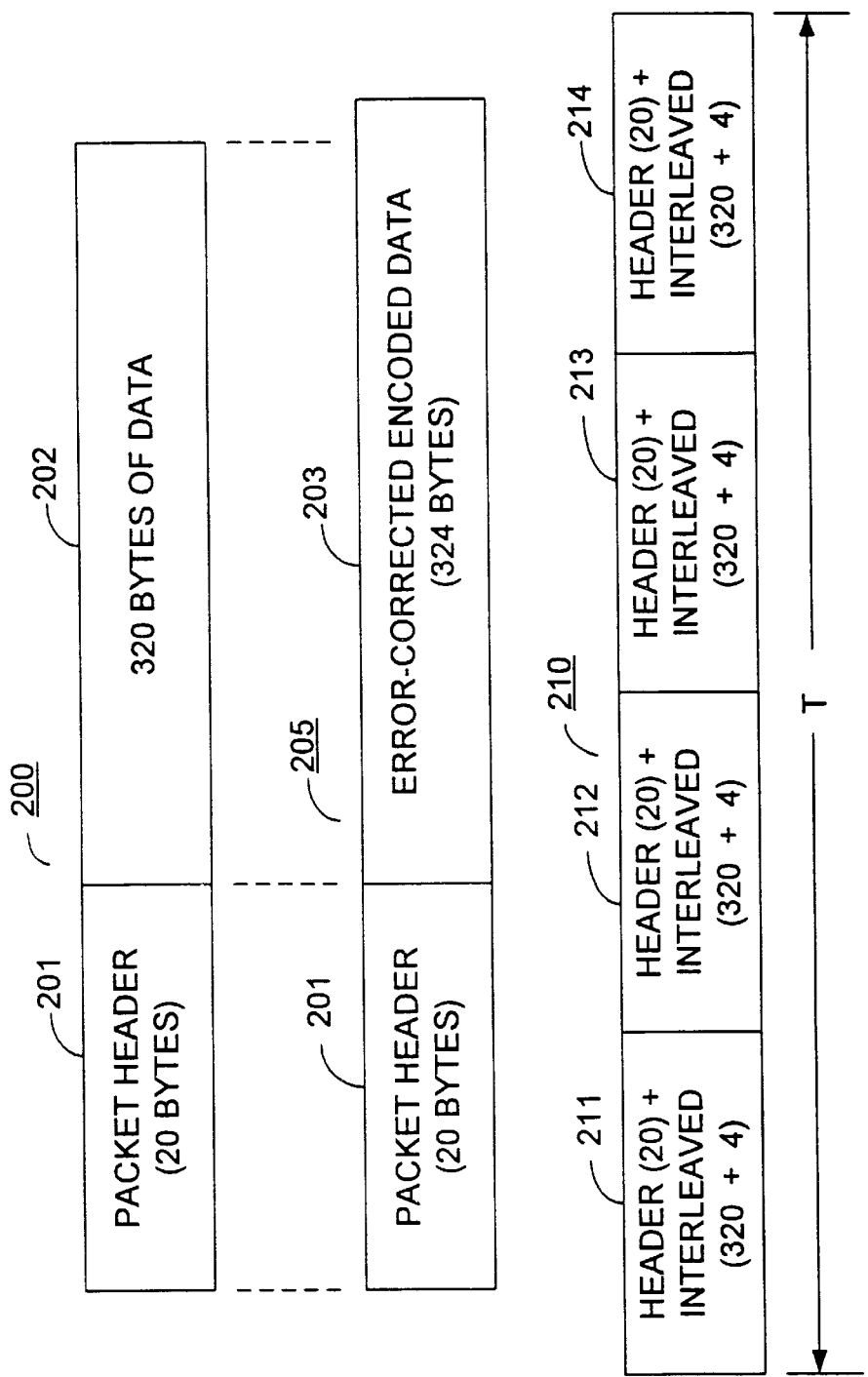
FIG. 2 is a pictorial representation of the composition of typical packet sequence in a conventional layered coding system.

Now with reference to FIG. 2, there is shown the make-up of a number of packets produced and/or processed by system 100 of FIG. 1, explained as follows. Packet 200 is a pictorial representation of a packet arriving at layered encoder 105 from a packet source (not shown). Packet 200 is composed of packet header 201 and data portion 202. The exemplary parameters shown in FIG. 2 are consistent with the example coding technique set forth in the Background Section. For instance, data portion 202 contains 320 bytes generated over a 40 ms sampling internal, whereas header 201 contains 20 bytes. As is typical for any data transmission system, data comprising packet 202 is processed with a forward error-correcting code (FEC) to allow for correction of up to a pre-determined number of errors (depending upon the FEC deployed) resulting from corruption of the packet due to interference as it traverses propagation path 103. Packet 205 is a pictorial representation of error-corrected encoded data having data portion 203 of length 324 bytes (the original 320 bytes plus 4 bytes of error correction), with header 201 still being of length 20 bytes (although the information in header 201 may change because of the modified length of the data portion).

As alluded to in the Background Section, in a standard non-layered encoding system, a sequence of packets of the form of packet 205 is emitted by mobile transmitter 101 that originates the packets. With layered coding, continuing with the example of the Background Section, ever set of four packets is interleaved and then emitted; packet sequence 210 is a pictorial representation of layered coding to illustrate grouping of packets. Now, each packet 211, 212, 213, or 214 is composed of interleaved samples from a set of 320×4 byte samples in a manner described earlier in the Background Section. For instance, packet 211 contains samples 1, 5, 9, . . . , 1223, and 1227. For each of these packets, forward-error correction encoding is also applied, again resulting in packets having a data portion of 324 bytes. Overall, the sequence of four packets extends over time duration of T seconds (e.g., 160 ms. for the exemplary parameters). Layered encoder 105 of FIG. 1 performs the interleaving and error-correction. (Historically, the terminology "layered coding" originated because the packets were visualized as being stacked or layered in order to produce the requisite samples for transmission, in much the same manner discussed in the Turletti et al. reference cited in the Background Section. The terminology is carried over to the inventive subject matter because the characteristics of layered coding are manifested in the inventive subject matter. In the sequel, layers and packets are used interchangeably).

Figure 3A:
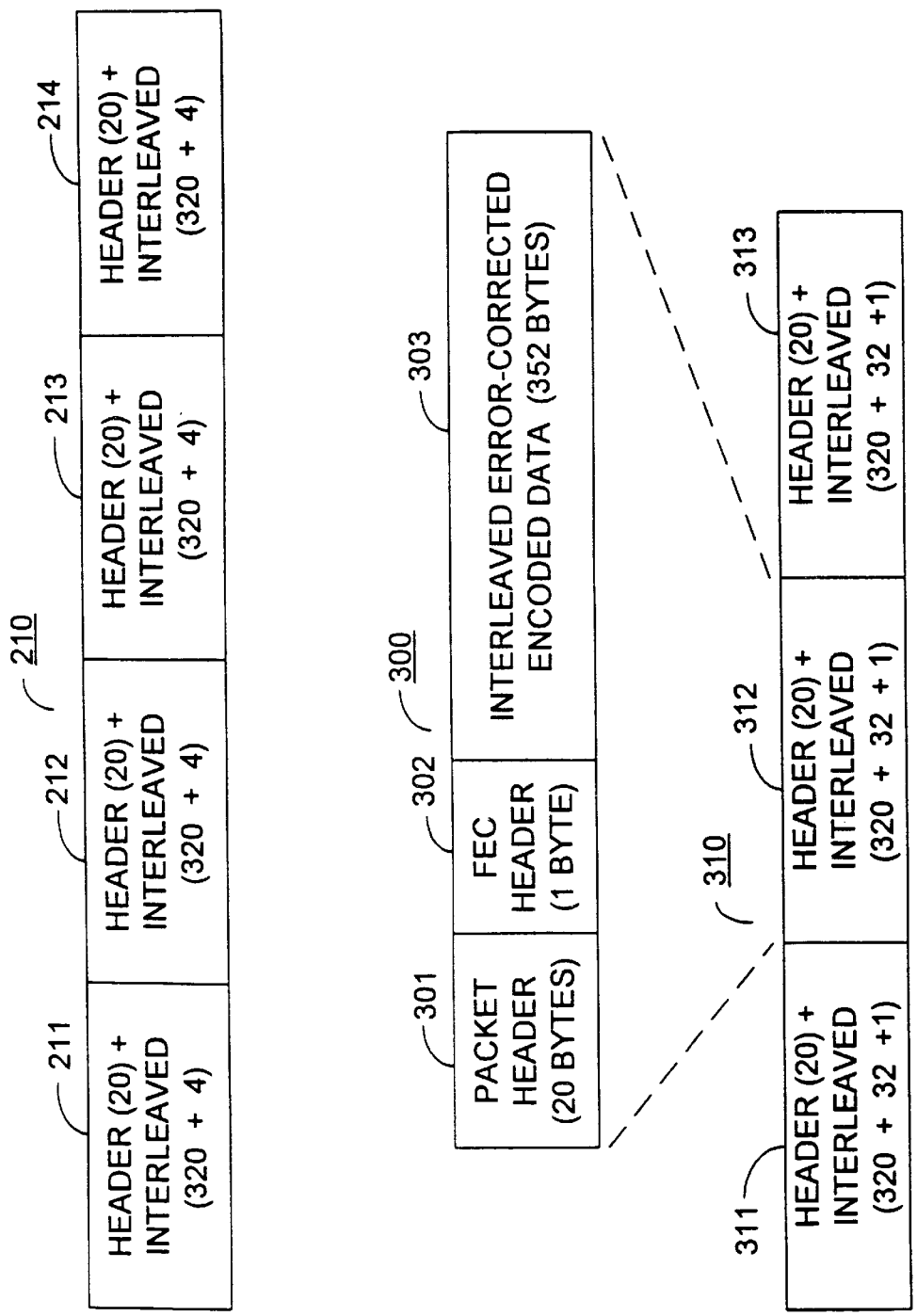
FIG. 3A is a pictorial representation of the composition of a packet sequence in a layered coding system in accordance with the present invention.
Figure 3B:
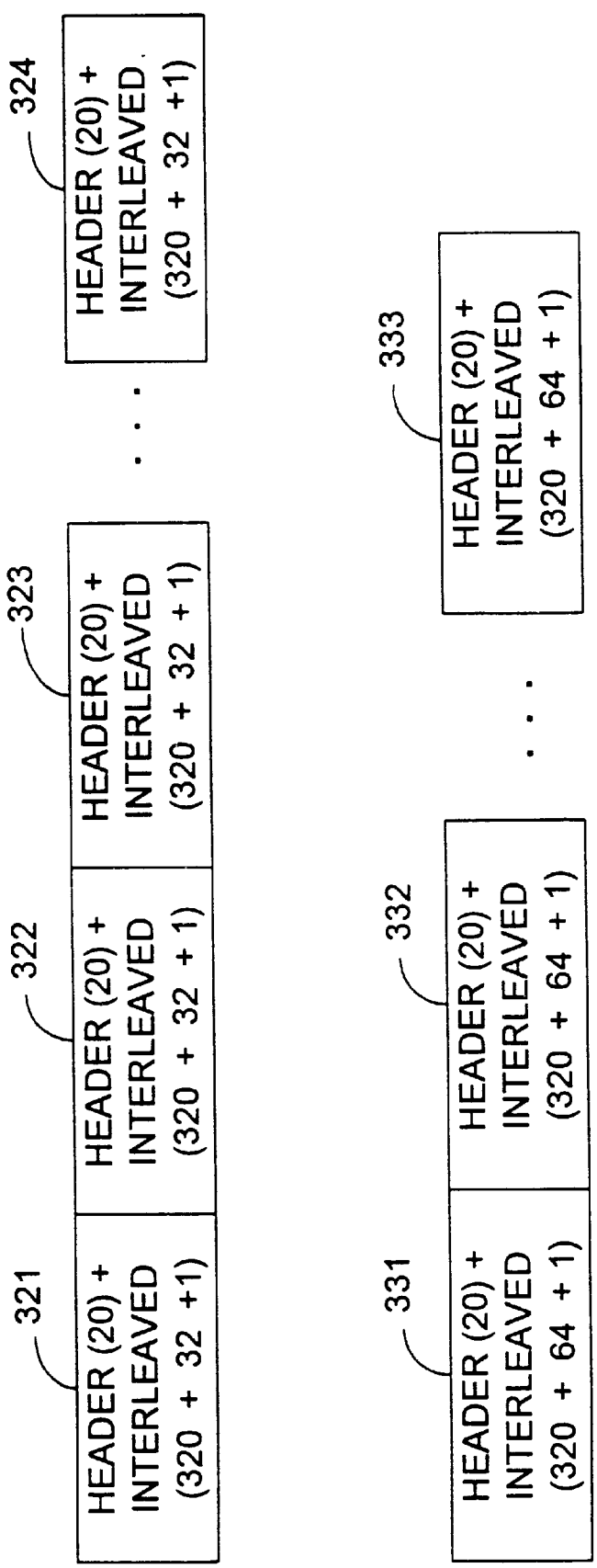
FIG. 3B is a pictorial representation of the composition of another packet sequence in a layered coding system in accordance with the present invention.

With reference now to FIG. 3A, there is shown on the top line packet sequence 210 of FIG. 2 for comparison to packet sequence 310 on the bottom line of FIG. 3A; packet sequence 310 is generated in accordance with the present invention. As is evident by comparing sequence 210 to sequence 310, sequence 310 is composed of one less packet than sequence 210. In addition, each packet of sequence 310 is composed of more bytes than each packet of 210; for example, packet 311 is made-up of 353 bytes, in contrast to 324 bytes of packet 211. The extra bytes in packets 311, 312, and 313 are for improved error-correction capability. The rationale behind the inventive technique is expressed as follows: it is often more effective to pre-actively not send packets in certain packet sequences and instead use the limited bandwidth B to increase the amount of forward error correction included in the packets being transmitted, where B is presumed to be the maximum available bandwidth to satisfy grade-of-service requirements. Thus in FIG. 3A, it is presumed that the packet containing samples 4, 8, 12, . . . , 1276, and 1280 (packet 214 of packet sequence 210) has not been included in packet sequence 310, and each transmitted packet 311, 312, or 313 has 32 error-correcting bytes as compared to 4-bytes of the conventional system. Moreover, one additional byte has been added to each packet 311, . . . , 313 and is designated as the forwarding error-correcting code (FEC) header. A breakdown of an exemplary packet in packet sequence 310 is shown by packet 300, wherein packet header 301, FEC header 302, and interleaved error-corrected encoded data 303 are identified. Finally, it is clear that packet sequence 310 requires a bandwidth which is less than or equal to B. It is possible to fill bandwidth B with packet sequence 310 by deploying a more robust FEC capability, that is, adding more FEC bytes. Thus, packet sequence 310 is merely exemplary of one possible arrangement of FEC capability. By way of another example, reference is made to FIG. 3B wherein is shown a plurality of packets (greater than 4) 321, 322, 323, . . . , 324 (of the same form as packets 311, 312, and 313 of FIG. 3A) making up another packet sequence in the top part of FIG. 3B; in the bottom part of FIG. 3B is shown a sequence of packets 331, 332, . . . , 333 each more robust than packets 321, 322, 323, and 324 because a the forward error-correcting code in packets 331, 332, and 333 uses more error-correction bytes (64 bytes versus 32 in the top part of FIG. 3B).

Figure 4B:
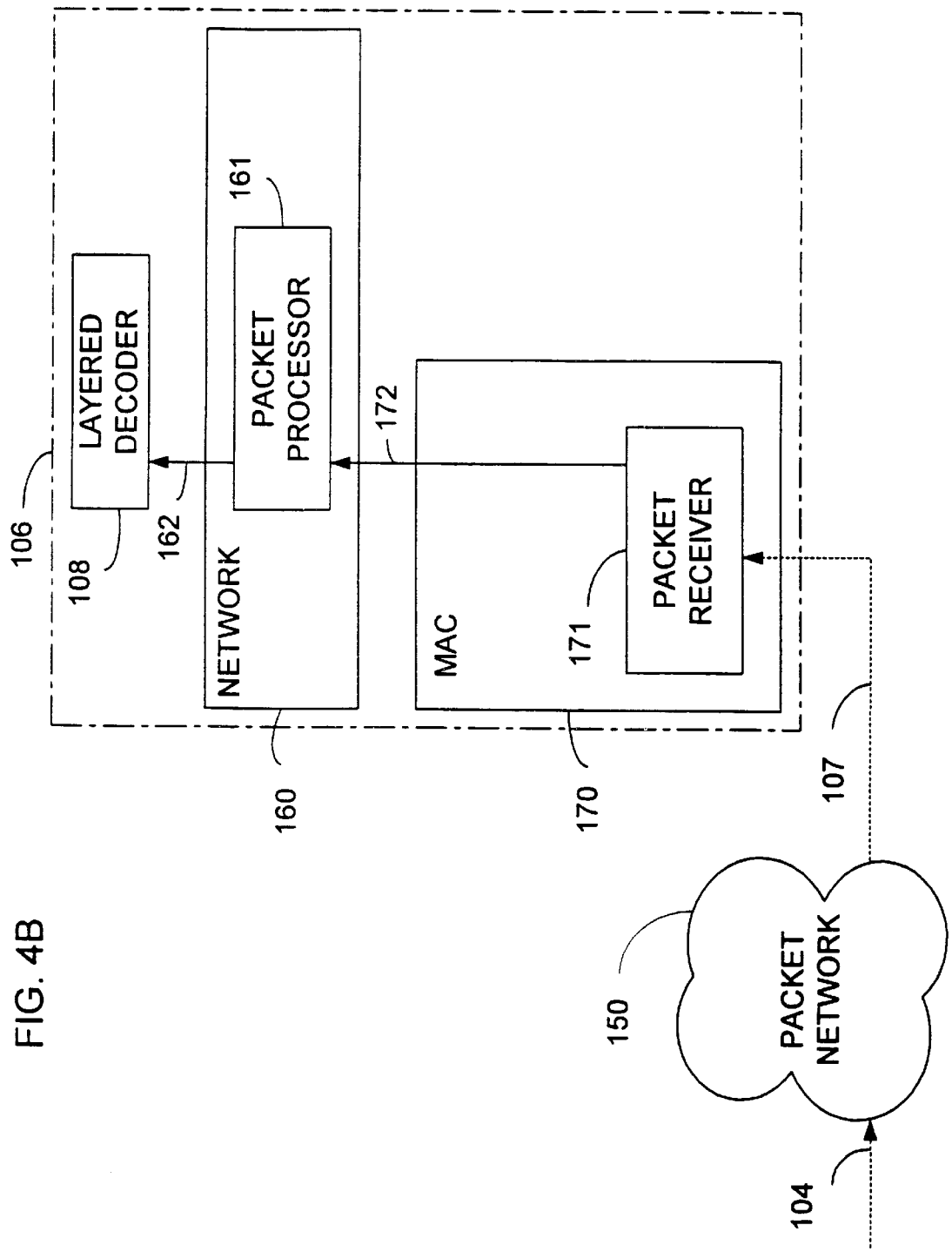
FIG. 4 composed of FIGS. 4A and 4B, is a high-level block diagram of a mobile terminal and a base station arranged in accordance with the present invention.

Now with reference to FIG. 4, which is composed of FIGS. 4A and 4B, there is shown a high-level block diagram of system 400 which effects the operation of the present invention (inventive system 400 of FIG. 4 is initially described at the same level of detail as conventional system 100 of FIG. 1). In FIG. 4, mobile terminal 401 is transceiving with base station 402 (FIG. 4A); in turn, base station 402 is transceiving with receiving terminal 106 (FIG. 4B—FIG. 4B and FIG. 1B are essentially the same).

The principle of operation in accordance with the present invention is implemented by two agents, namely, Send Adaptation Agent (SAA) 423 and the Receive Adaptation Agent (RAA) 443 residing on mobile terminal 401 and base station 402, respectively. These two agents are interposed between the traditional network layer and the wireless MAC layer of the protocol stack. For instance, SAA 423 is interposed between packet processor 111 of network layer 110 and packet transceiver 422 of wireless MAC layer 420, whereas RAA 443 is interposed between transceiver 441 of wireless MAC layer 440 and packet processor 131 of network layer 130.

The principle of operation of the present invention is readily understood by first focusing on a voice communication during which mobile terminal 401 is acting as a sender of voice-over-IP packets and base station 402 is receiving the packets. In this situation, as in the traditional layered coding approach, layered encoder 105 encapsulates the voice samples into packets for each layer and forwards the encoded packets to packet processor 111 in network layer 110, as in the conventional system Network layer 110, after any requisite processing, forwards the packets to SAA 423. In addition, SAA 423 receives from terminal channel controller 424 an estimate of the current bit-error rate (BER) being experienced on over-the-air propagation path 403 for packet transmission from terminal 401 to base station 402. The BER is determined in BER device 445 in base station 402, and transmitted to terminal 401 via base station channel controller 444 and over-the-air propagation path 403, which is now shown as being bi-directional even for the case of propagating packets from terminal 401 to base station 402. Path 403 is bi-directional so that the BER can be fed back from wireless MAC layer 440 to wireless MAC layer 420. The manner of providing the BER estimate is discussed in the sequel.

SAA 423 operates so as to maximize the expected number of packets delivered correctly over the wireless path 403. To meet this goal, SAA 423 uses the BER to adaptively determine: (i) the number of packets to send in a packet sequence over the wireless path 403; and (ii) the amount of forward error correction to be used in each packet of the packet sequence being sent. By way of reiteration, the rationale is that it is often better to pro-actively not send packets in certain packet sequences and instead use the limited bandwidth to increase the amount of forward error correction included in the packets being transmitted. After encoding the packets with the error correction code, SAA 423 encapsulates the packet with header 302 (FIG. 3A) indicating the error correcting code it has used and the number of layers it has selected. SAA 423 then forwards the packet sequence 310 (FIG. 3A) to packet transceiver 422 which then transmits the packet to base station 402 over path 403 just as in the traditional wireless network approach. (It is noted, for FIG. 1, that transmitter 122 may append another header to packets incoming from processor 111, or for FIG. 4, that transceiver 422 may append another header to packets incoming from SAA 423, but these headers need not be considered for the purposes of the present invention since these headers have the same format for either the conventional system or the inventive system).

At base station 402, wireless MAC layer 440 receives the transmitted packets and forwards the packets to RAA 443. RAA 443 uses the error correcting code conveyed by the packets to correct the bit errors introduced by wireless path 403 and then removes the error-correcting code bits inserted by SAA 423. RAA 443 forwards the error-corrected packets to packet processor 131 of network layer 130. The network layer is unaware that packets have been processed by SAA 423 at mobile terminal 401 and RAA 443 at base station 402. To network layer 130, packets appear as they would in a traditional layered coding scheme. From this point forward, the rest of the description of FIG. 4A, as well as FIG. 4B, is basically the same as in FIGS. 1A and 1B, respectively.

A similar sequence of steps occurs when mobile terminal 401 is receiving voice-over-IP packets from the fixed terminal (not shown) via base station 402. In this case, there is an equivalent SAA in base station 402 which is responsible for adaptively determining the number of layers to transmit and the amount of forward error correction to be used in each layer. An equivalent RAA in mobile terminal 401 corrects the received packets in MAC layer 420 and forwards only the corrected packets to network layer 110 in mobile terminal 401.

Details of Illustrative Embodiment

Procedure Used by the SAA

The algorithm used by SAA 423 to make its decisions is now formally described. Consider a voice-over-IP application that uses N layers. This means that the application periodically, say once every T seconds, generates N packets of say length L bits. Further suppose that due to contractual agreement between the application and the network, the application is not allowed to send more than B bits every T seconds.

Let $c_0, c_1, \ldots, c_{K-1}$ be K forward error-correcting codes $0 \leq K \leq N-1$, such that $c_i$ is more powerful than $c_j$ if i<j, that is, Prob [correct packet delivery using $c_i$] $\geq$ Prob [correct packet delivery using $c_j$].

Let $C_i$, $0 \leq i \leq K-1$, denote the number of additional bits required to encode a packet of length L bits using code $c_i$. Note that, since $c_i$ is more powerful than $c_j$ if i<j, it is expected that $C_i \geq C_j$. For the sake of argument, but without loss of generality, it is assumed that the codes have been selected such that for $0 \leq i \leq K-1$.

$$(L+C_{i-1})(N-i) > B > (L+C_i)(N-i).$$

Observe that, since the application can only send B bits every T seconds, the above condition on $C_i$ means that if $c_i$ is used as the forward error correcting code, then the application can send at most N−i layers over the wireless link.

Let $p_i(b)$ denote the probability of correct delivery of a packet of length L bits using forward error correcting code $c_i$ when the average bit-error rate in the channel is b. Then, the pseudo-code below depicts the algorithm implemented by SAA 423. In this algorithm, note that $(N-i) \cdot p_i(b)$ is the expected number of layers that will be correctly delivered over the wireless channel if N−i layers are transmitted using code $c_i$. Therefore, the algorithm chooses to send k layers such that k maximizes the expected number of correctly delivered layers given the current bit-error rate b.

SAA Algorithm

Repeat every T seconds:

(a) obtain an estimate, b, of the current bit-error rate from the MAC layer (b) let k=arg $\max_{0 \leq i \leq K-1}$ (N−i)·$p_i$(b)

(c) send k layers using $C_k$ as the forward error-correcting code

For example, let N=4, B=64 Kbps, and T=80 ms. Then, for uncompressed voice-over-IP applications, L=186×8 bits. Let K=2, and let $c_1$=(194,186) Reed-Solomon code, and $c_0$=(202,186) Reed-Solomon code. Code $c_1$ can therefore correct errors in at most 4 bytes, while code $c_0$ can correct errors in at most 8 bytes. If bit errors are assumed to be independent, then $$p_1(b) = \sum_{e=0}^{4} \binom{194}{e} q(b)^e (1-q(b))^{(194-e)},$$

$$p_0(b) = \sum_{e=0}^{8} \binom{202}{e} q(b)^e (1-q(b))^{(202-e)},$$

where $q(b)=1-(1-b)^8$.

For these values, the SAA will send four layers using $c_1$ if b<0.0025 and three layers using $c_0$ if b>0.0025.

Figure 5:
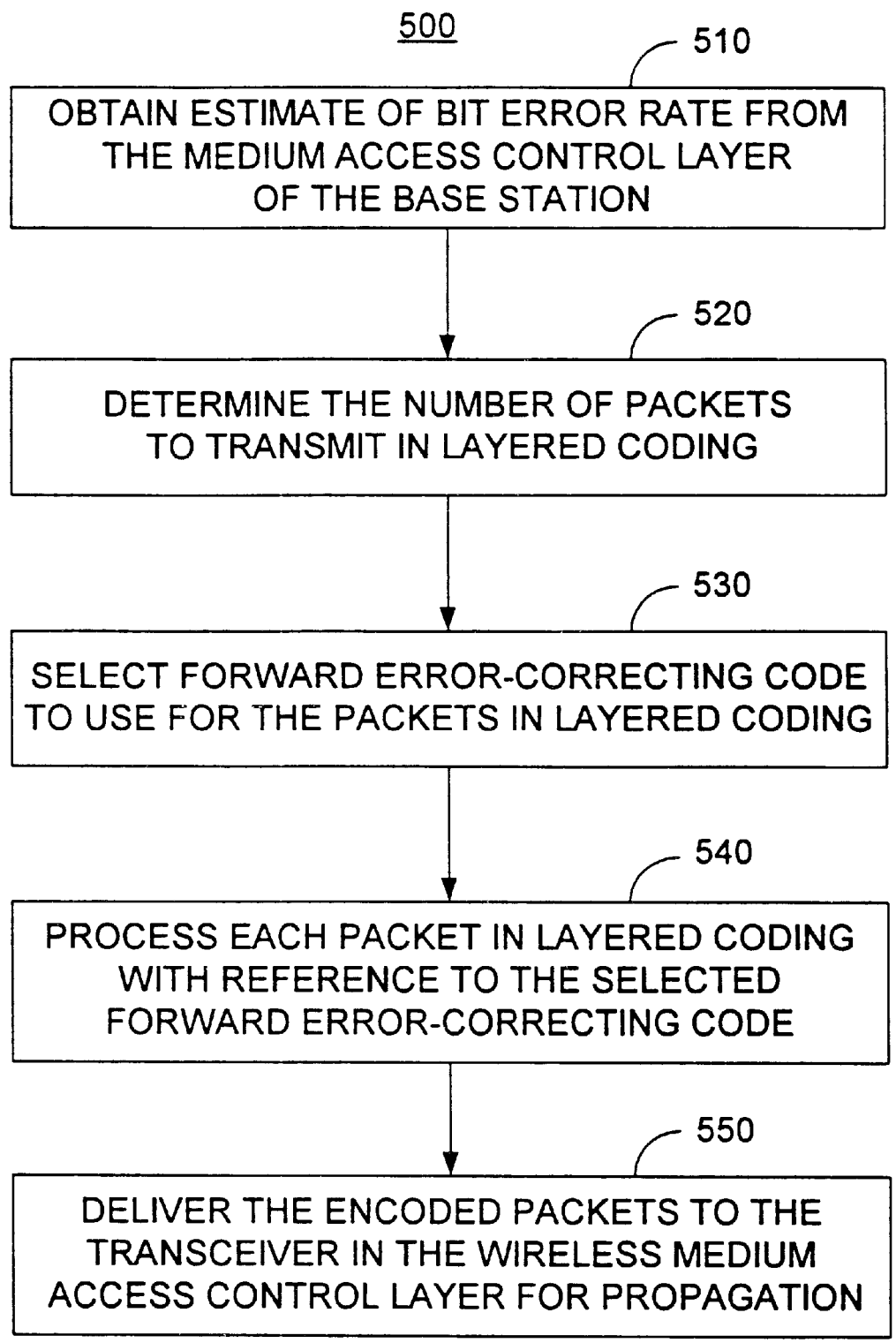
FIG. 5 is a flow diagram for the Send Adaptive Agent of FIG. 4.

Flow diagram 500 of FIG. 5 summarizes the operational flow carried out by SAA 423. In particular, processing block 510 is invoked to obtain an estimate of the bit-error rate of path 403 in the direction of propagation from mobile terminal 401 to base station 402. Next, processing block 520 is executed to determine the number of packets to transmit using the SAA Algorithm. Then processing block 530 is invoked to select the error-correcting code to use for the packets, and processing block 540 is executed to process each packet with reference to the selected error-correcting code. Finally, processing block 550 is invoked such that the encoded packets are delivered to packet transceiver 422 for propagation over path 403.

Procedure Used by the RAA

The algorithm used by RAA 443 is straightforward. It waits for a certain amount of time (say T seconds) for receiving all the packets transmitted over wireless link 403. By looking at the header in each received packet, RAA 443 knows the error correcting code used and the number of packets to expect in packet sequence 310. RAA 443 then removes the forward error-correcting code inserted by SAA 423, and using the error correcting code, RAA 443 corrects the bit errors in each received packet if at all possible. RAA 443 forwards the corrected packets to network layer 130 and discards then uncorrectable packets.

Figure 6:
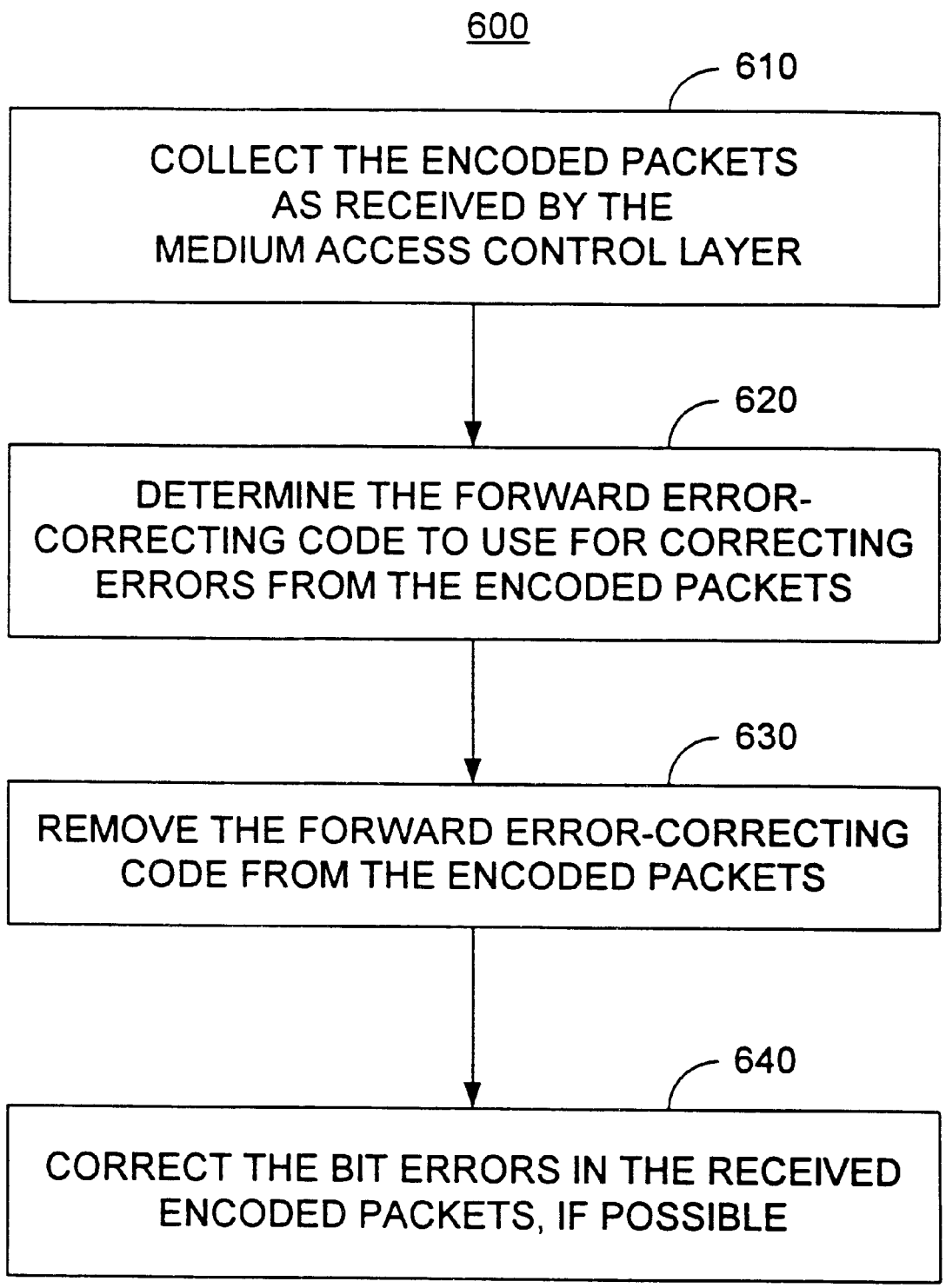
FIG. 6 is a flow diagram for the Receiver Adaptive Agent of FIG. 4.
Figure 7:
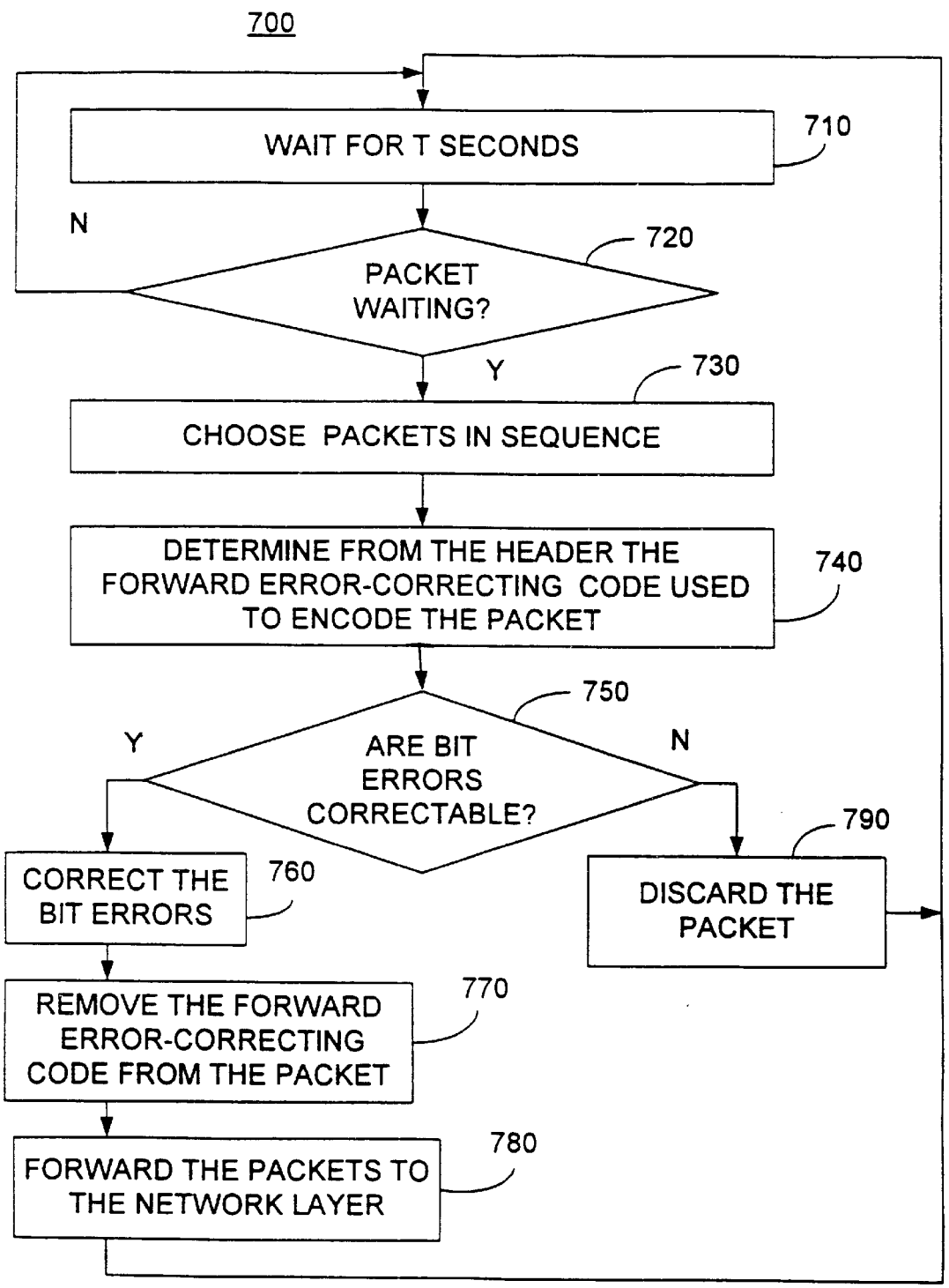
FIG. 7 is a flow diagram of the algorithm inplemented by the Receiver Adaptive Agent.

Flow diagram 600 of FIG. 6 summarizes the operational flow carried out by RAA 443. In particular, processing block 610 is invoked to collect the encoded packets as received by packet transceiver 441 of MAC layer 440. Next, processing block 620 is invoked to determine the forward error-correcting codes to use for correcting errors in the encoded packets. The forward error-correcting code inserted by SAA 423 is removed from the encoded packets via processing block 630, and then the bit errors in the received encoded packets are corrected, if possible, by processing block 640.

Flow diagram 700 summarizes the operation of RAA 443 from another viewpoint. In particular, processing block 710 operates in T second intervals since the sequence of an adaptive layered encoded packet sequence, of which packet sequence 310 is exemplary, arrives in blocks of $\leq$T seconds. Next, decision block 720 is entered to determine if a packet is waiting for processing. If not, then processing branches to processing block 710. If a packet is awaiting processing, then processing block 730 selects the waiting packet(s) in sequence. As per processing block 740, each packet header containing information about error-correction is parsed to determine the specific error-correction code used to encode each packet (eg., 311, 312, 313) in packet sequence 310. Next, decision block 750 is entered to determine if bit errors, when present, are correctable. If not, the packet is useless, and is discarded via processing block 790. If errors are correctable, then processing block 760 is entered to correct the errors with the identified error-correcting code. Processing block 770 is invoked to remove the forward error-correcting code inserted by SAA 423. Finally, processing block 780 is executed to forward error-corrected packets in sequence 310 to network layer 130. After processing by block 780 or block 790, processing block 710 is entered to wait T seconds before processing the next incoming packet sequence of the form of packet sequence 310.

Solution for Estimating b (Bit-Error Rate or BER)

It is recalled that the technique in accordance with the present invention requires that wireless MAC layer 440 provide feedback to SAA 423 regarding current bit-error rate. There are several possible ways for wireless MAC layer 440 to obtain this information. One possible method is for base station 402 and mobile terminal 401 to use a "pilot channel" whereby base station 402 and mobile terminal 401 both transmit a known bit pattern using a special wireless channel called the "pilot channel". The receiver (i.e., the base station for the pilot channel transmitted by the mobile and vice versa) estimates the bit error rate by measuring the fraction of the bits of the known bit pattern that were received incorrectly. This information is conveyed back to the sender again using a pre-determined set of the bits in the pilot channel. To ensure that the bit-error rate estimate is conveyed without error, the pilot channel may also use error-correcting coding (or another known technique to ensure fidelity of the received data).

Figure 8:
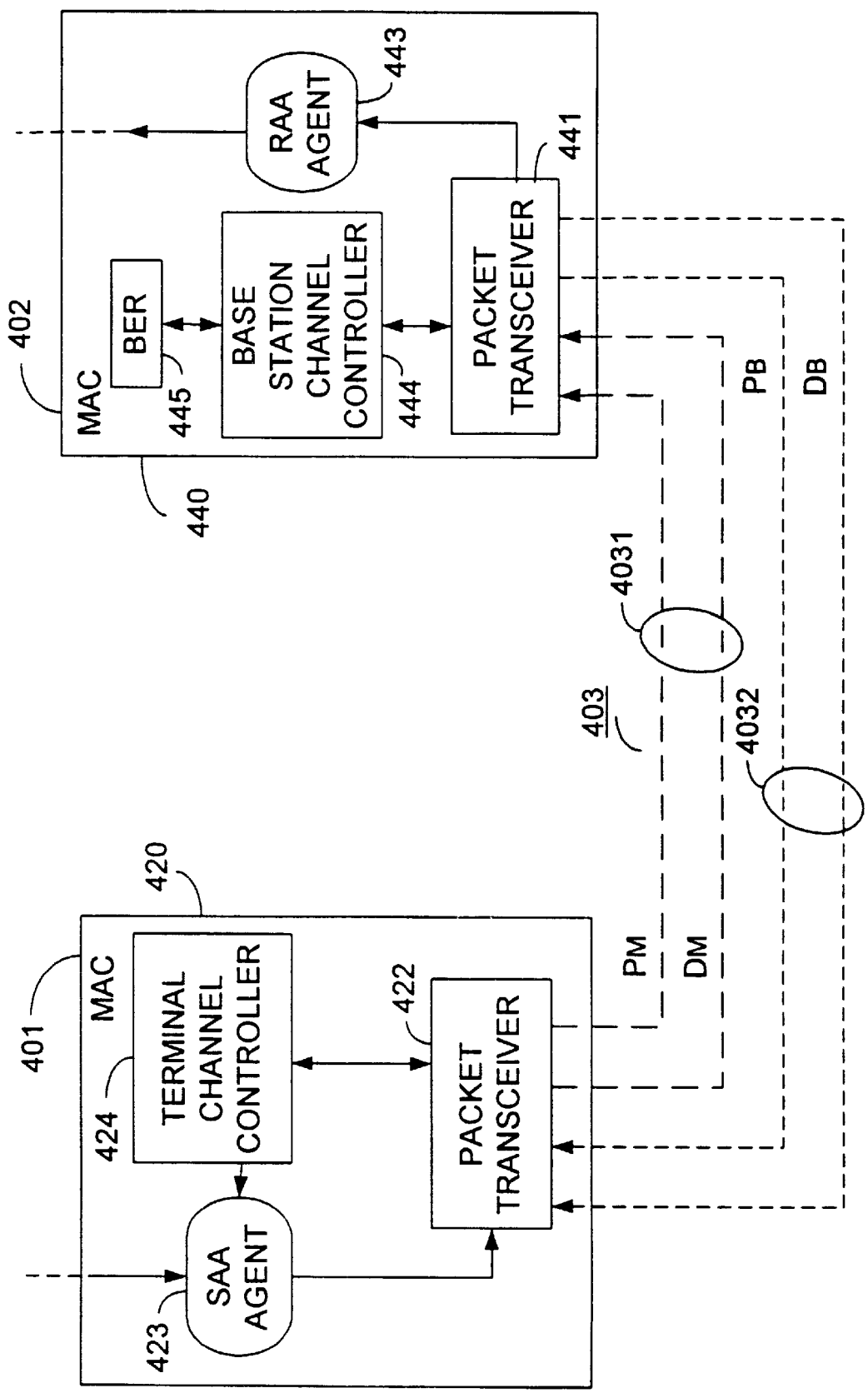
FIG. 8 is a high-level block diagram of elements arranged to provide and estimate of the bit-error rate for the adaptive layered coding algorithm.

For example, system 800 of FIG. 8 (which focuses on the pertinent portion of FIG. 4 used to determine the BER) shows one possible method for estimating the BER (designated b in the SAA Algorithm) on the wireless channel 403 propagating packets from mobile terminal 401 to the base station 402. (Over-the-air channel 403 of FIG. 4 is now separated in two separate over-the-air physical paths, namely, path 4031 for propagation from terminal 401 to base station 402, and path 4032 for propagation from base station 402 to terminal 401). In this example system of FIG. 8, mobile terminal 401 uses a data channel (referred to as DM) for conveying its data packets (e.g., the Voice-over-IP packets) to the base station 402 and a separate pilot channel (referred to as PM) for repeatedly transmitting a known sequence of bits to base station 402 from terminal 401. For instance, in a Code Division Multiple Access (CDMA) system, the DM and PM correspond to different spreading codes; in a Time Division Multiple Access (TDMA) system, the DM and PM correspond to different time slots; and in a Frequency Division Multiple Access (FDMA) system, the DM and PM correspond to different frequencies.

To estimate the BER on the DM, base station 402 decodes the bits it receives on the PM and compares the decoded bits to a predetermined, known set of transmitted bits. From this comparison, base station 402 can estimate the BER being experienced on PM and, presumably, that the same BER is occurring on DM as well. Base station 402 may then use a separate pilot channel (referred to as PB) to periodically convey its estimated BER for channel DM.

Note that, when it is not transmitting the bit-error rate information, base station 402 may transmit a known sequence of bits on channel PB. This channel can then be used to estimate the BER being experienced on the data channel DB from base station 402 to mobile terminal 401; base station 402 uses DB to relay the packets destined for mobile terminal 401.

With reference to FIG. 8, to determine the BER for propagation from terminal 401 to base station 402, terminal channel controller 424 supplies packet transceiver 422 with a known sequence of bits in appropriate packet format for propagation to base station 402 in pilot channel PM of path 4031. In turn, packet transceiver 441 receives the packet having the known bit sequence arriving over channel PM, and passes this packet to channel controller 444. The packet is parsed to obtain the detected bits in the known bit sequence, and the detected bits are passed to BER device 445 wherein the ratio of incorrectly received bits to the total number of bits is used to compute the BER estimate. The BER estimate is returned from BER device 445 every T seconds to terminal channel controller 424 via the cascade path of: base station controller 444, packet transceiver 441, PB of over-the-air path 4032, and packet transceiver 422.

Generalizations

Although the illustrative embodiment has depicted the SAA and the RAA as residing in the MAC layer, it is readily contemplated that the SAA and/or RAA can be depicted as residing in an arrangement physically located between the network layer and the MAC layer. In this arrangement, the adaptive layered coding is transparent to both the network layer and the MAC layer.

Although various embodiments which incorporate the teachings of the present invention have been shown and described in detail herein, those skilled in the art can readily devise many other varied embodiments that still incorporate these teachings.

What is claimed is:

1. A method for processing a number of packets from a sequence of packets for delivery over a path correctly, wherein said sequence of packets can only be delivered once and within a predefined time interval, wherein the bandwidth available for said delivery is predefined, and wherein the path has a measurable bite-error-rate, said method comprising the steps of:

based on the measurable bit error rate and constrained by both the predefined bandwidth and the predefined delivery time interval, determining a forward error-correcting code and the number of packets from the sequence of packets that can be delivered correctly.

based on the determined number, identifying which packets from the sequence of packets to deliver and deleting all other packets, and encoding the identified packets with the determined forward error-correcting code.

2. The method as recited in claim 1 further comprising the step of determining the bit-error rate of the path for each sequence of packets to be delivered.

3. The method as recited in claim 2 further comprising the step of propagating a known set of data to determine the bit error rate of the path.

4. The method as recited in claim 1 wherein the sequence of packets comprises a plurality of voice data samples interleaved among the sequence of packets.

5. The method as recited in claim 4 further comprising the steps of delivering the identified packets over the path, correcting errors in each of the identified packets using the forward error-correcting code used to encode the packets, and generating interpolated data samples using the data samples from the corrected packets to reconstruct missing data samples.

6. The method as recited in claim 1 further comprising the step of appending to each of the identified packets a header to convey the determined number of packets and the determined forward error-correcting code used to encode each of the packets.

7. The method as recited in claim 1 wherein if the bit-error rate is below a prescribed threshold, the determined number of packets includes the entire sequence of packets.

8. The method as recited in claim 1 wherein the path utilizes a set of codes in a code division multiplex access (CDMA) format for propagation, and further comprising the step of delivering the identified packets over the path as a predetermined one of the CDMA codes.

9. The method as recited in claim 1 wherein the path utilizes a set of codes frequency bands in a frequency division multiplex access (FDMA) format for propagation, and further comprising the step of delivering the identified packets over the path in a predetermined one of the FDMA frequency bands.

10. The method as recited in claim 1 wherein the path utilizes a set of time slots in a time division multiplex access (TDMA) format for propagation, and further comprising the step of delivering the identified packets over the path in a predetermined one of the TDMA slots.

11. A system for processing a number of packets from a sequence of packets for delivery over a path correctly, wherein said sequence of packets can only be delivered once and within a predefined time interval, wherein the bandwidth available for the delivery is predefined, and wherein the path has a measurable bit-error-rate, said system comprising:

means for determining a forward error-correcting code and the number of packets from the sequence of packets that can be delivered correctly wherein said determining means considers the measurable bit error rate and is constrained by both the predefined bandwidth and the predefined delivery time interval, means for identifying which packets from the sequence of packets to deliver based on the determined number, and for deleting all other packets, and means for encoding the identified packets with the determined forward error-correcting code.

12. The system as recited in 11 wherein the sequence of packets comprises a plurality of voice data samples interleaved among the sequence of packets.

13. The system as recited in claim 11 further comprising means for determining the bit-error rate of the path for each sequence of packets to be delivered.

14. The system as recited in claim 13 further comprising means for propagating a known set of data for determining the bit error rate of the path.

* * * * *

UNITED STATES PATENT AND TRADEMARK OFFICE
CERTIFICATE OF CORRECTION

PATENT NO. : 6,434,191 B1 Page 1 of 1
DATED : August 13, 2002
INVENTOR(S) : Prathima Agrawal et al.

It is certified that error appears in the above-identified patent and that said Letters Patent is hereby corrected as shown below:

Column 11,
Line 7, after "utilizes a set of", delete "codes".

Signed and Sealed this

Twenty-ninth Day of November, 2005

JON W. DUDAS
*Director of the United States Patent and Trademark Office*